(12) United States Patent
Tateno

(10) Patent No.: US 7,778,988 B2
(45) Date of Patent: Aug. 17, 2010

(54) INFORMATION PROCESSING DEVICE, METHOD, AND PROGRAM FOR DETERMINING RELATIVITY BETWEEN CONTENTS

(75) Inventor: Kei Tateno, Kanagawa (JP)

(73) Assignee: Sony Corporation, Tokyo (JP)

( * ) Notice: Subject to any disclaimer, the term of this patent is extended or adjusted under 35 U.S.C. 154(b) by 404 days.

(21) Appl. No.: 11/713,642

(22) Filed: Mar. 5, 2007

(65) Prior Publication Data
US 2007/0214124 A1  Sep. 13, 2007

(30) Foreign Application Priority Data
Mar. 10, 2006  (JP)  ............... 2006-066469

(51) Int. Cl.
*G06F 17/30*  (2006.01)
(52) U.S. Cl. .............. 707/705; 707/769; 707/723; 707/724; 707/726; 707/737
(58) Field of Classification Search ............... 707/1, 707/3, 705, 769, 723, 724, 726, 737
See application file for complete search history.

(56) References Cited

U.S. PATENT DOCUMENTS

| | | | | |
|---|---|---|---|---|
| 5,537,132 A | * | 7/1996 | Teraoka et al. | 707/E17.013 |
| 6,671,683 B2 | * | 12/2003 | Kanno | 707/5 |
| 7,231,388 B2 | * | 6/2007 | Matsubayashi et al. | 707/5 |
| 7,302,638 B1 | * | 11/2007 | Wolfe | 707/3 |
| 2002/0065814 A1 | * | 5/2002 | Okamoto et al. | 707/3 |
| 2005/0114324 A1 | * | 5/2005 | Mayer | 707/3 |
| 2005/0165782 A1 | | 7/2005 | Yamamoto | |
| 2006/0282258 A1 | * | 12/2006 | Tsuzuki et al. | 704/10 |

FOREIGN PATENT DOCUMENTS

| | | |
|---|---|---|
| JP | 03 172966 | 7/1991 |
| JP | 3-172966 | 7/1991 |
| JP | 2001-195415 | 7/2001 |
| JP | 2003-248686 | 9/2003 |
| JP | 2005-165632 | 6/2005 |
| JP | 2006-048286 | 2/2006 |

OTHER PUBLICATIONS

S. Deerwester et al., "Indexing by Latent Semantic Analysis," Journal of the American Society of Information Science, vol. 41, Issue 6, pp. 391-407 (1990).
T. Hofmann, "Probabilistic Latent Semantic Analysis," Proc. Uncertainty in Artificial Intelligence (1999).

* cited by examiner

*Primary Examiner*—Mohammad Ali
*Assistant Examiner*—Thuy (Tiffany) Bui
(74) *Attorney, Agent, or Firm*—Finnegan, Henderson, Farabow, Garrett & Dunner, L.L.P.

(57) ABSTRACT

The present invention provides an information processing device including a generating section, a calculating section, a link detecting section, and a presenting section.

11 Claims, 21 Drawing Sheets

FIG. 3

| | "SAD" | "HEARTRENDING" | "SENTIMENTAL" | "GROOVY" | "VIBRANT" | "PURE" |
|---|---|---|---|---|---|---|
| ARTIST A | 2 | 2 | 1 | 2 | 3 | 0 |
| ARTIST B | 0 | 1 | 3 | 0 | 0 | 0 |
| ARTIST C | 1 | 2 | 2 | 0 | 1 | 0 |
| ARTIST D | 0 | 0 | 1 | 3 | 2 | 0 |
| ARTIST E | 0 | 0 | 0 | 2 | 3 | 1 |

FIG.5

$$D = Nc \underbrace{\left\{ \left( UmSm^{1/2} \right) \right\}}_{m}$$

FIG.6

$$W = Nw \underbrace{\left\{ \left( VmSm^{1/2} \right) \right\}}_{m}$$

FIG.7

|  | FIRST DIMENSION | SECOND DIMENSION | THIRD DIMENSION |
|---|---|---|---|
| ARTIST A | 1.42 | 1.63 | 0.32 |
| ARTIST B | 2.05 | 0.38 | -0.14 |
| ARTIST C | 2.33 | -0.49 | 0.30 |
| ARTIST D | 0.41 | 2.46 | 0.14 |
| ARTIST E | 0.33 | 2.51 | -0.20 |

FIG.8

|  | FIRST DIMENSION | SECOND DIMENSION | THIRD DIMENSION |
|---|---|---|---|
| "SAD" | 1.78 | 0.31 | 0.12 |
| "HEARTRENDING" | 2.14 | -0.28 | 0.41 |
| "SENTIMENTAL" | 1.94 | 0.15 | -0.27 |
| "GROOVY" | -0.32 | 2.33 | -0.24 |
| "VIBRANT" | 0.42 | 2.27 | -0.38 |
| "PURE" | 0.45 | -0.21 | 1.68 |

FIG. 9

| | "SAD" | "HEARTRENDING" | "SENTIMENTAL" | "GROOVY" | "VIBRANT" | "PURE" |
|---|---|---|---|---|---|---|
| ARTIST B | 0.77 | 0.52 | 0.67 | 0.03 | 0.03 | 0.04 |
| ARTIST C | 0.72 | 0.56 | 0.63 | -0.22 | -0.04 | 0.09 |
| ARTIST D | 0.26 | 0.03 | 0.16 | 0.60 | 0.80 | 0.00 |
| ARTIST E | 0.23 | -0.01 | 0.15 | 0.61 | 0.81 | -0.04 |

FIG.13

| WORD | CLUSTER 1 ("HEARTRENDING") | CLUSTER 2 ("GROOVY") | CLUSTER 3 ("PURE") |
|---|---|---|---|
| "SAD" | 1 | 0 | 0 |
| "HEARTRENDING" | 1 | 0 | 0 |
| "SENTIMENTAL" | 1 | 0 | 0 |
| "GROOVY" | 0 | 1 | 0 |
| "VIBRANT" | 0 | 1 | 0 |
| "PURE" | 0 | 0 | 1 |

FIG.14

|  | "HEARTRENDING" | "GROOVY" | "PURE" |
|---|---|---|---|
| ARTIST B | 1.96 | 0.33 | 0.04 |
| ARTIST C | 1.91 | -0.25 | 0.09 |
| ARTIST D | 0.44 | 1.39 | 0.00 |
| ARTIST E | 0.36 | 1.42 | -0.04 |

| EXTRACTED INFORMATION CLUSTER | DEGREE OF ASSOCIATION WITH LINK SOURCE CONTENT |
|---|---:|
| "HEARTRENDING" | 1.17 |
| "GROOVY" | 0.72 |
| "PURE" | 0.02 |

FIG. 19

|  | "SAD" | "HEARTRENDING" | "SENTIMENTAL" | "GROOVY" | "VIBRANT" | "PURE" |
|---|---|---|---|---|---|---|
| LINK DESTINATION CANDIDATE CLUSTER 1 | 0.76 | 0.56 | 0.66 | -0.10 | 0.12 | 0.06 |
| LINK DESTINATION CANDIDATE CLUSTER 2 | 0.24 | 0.01 | 0.15 | 0.60 | 0.81 | -0.02 |

FIG.21

|  | "HEARTRENDING" | "GROOVY" | "PURE" |
|---|---|---|---|
| LINK DESTINATION CANDIDATE CLUSTER 1 | 1.98 | 0.02 | 0.06 |
| LINK DESTINATION CANDIDATE CLUSTER 2 | 0.40 | 1.41 | -0.02 |

FIG. 23

| | "SAD" | "HEARTRENDING" | "SENTIMENTAL" | "GROOVY" | "VIBRANT" | "PURE" |
|---|---|---|---|---|---|---|
| ARTIST A | 0.76 | 0.56 | 0.65 | -0.09 | 0.14 | 0.08 |
| ARTIST B | 0.98 | 0.91 | 0.95 | -0.01 | 0.06 | 0.06 |
| ARTIST C | 0.91 | 0.98 | 0.89 | 0.05 | -0.01 | 0.15 |
| ARTIST D | 0.33 | 0.04 | 0.22 | -0.13 | 0.16 | -0.01 |
| ARTIST E | 0.29 | -0.01 | 0.21 | -0.13 | 0.17 | -0.06 |

FIG.24

|  | "HEARTRENDING" | "GROOVY" | "PURE" |
|---|---|---|---|
| ARTIST A | 1.98 | 0.05 | 0.08 |
| ARTIST B | 2.84 | 0.05 | 0.06 |
| ARTIST C | 2.79 | 0.04 | 0.15 |
| ARTIST D | 0.59 | 0.03 | -0.01 |
| ARTIST E | 0.48 | 0.03 | -0.06 |

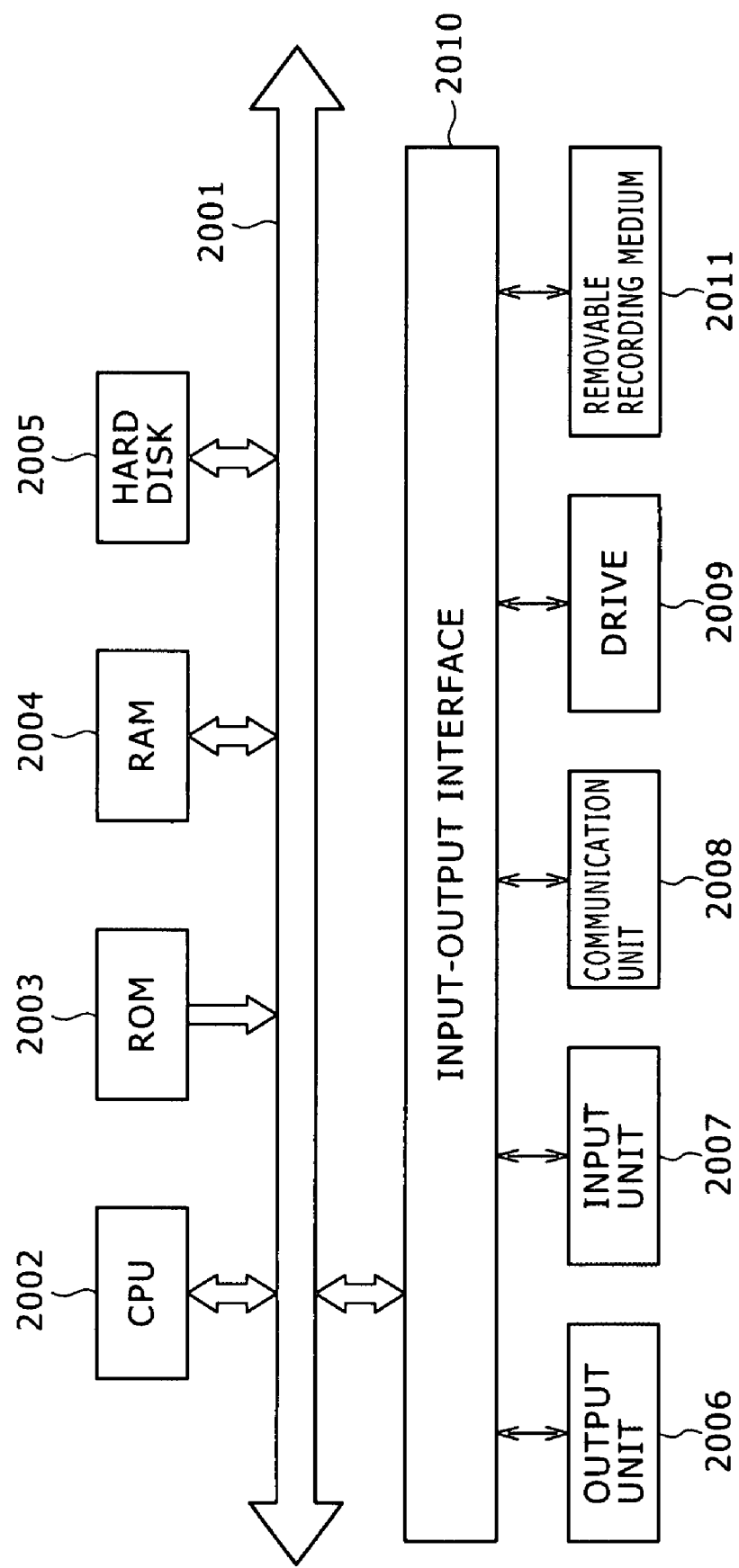

INFORMATION PROCESSING DEVICE, METHOD, AND PROGRAM FOR DETERMINING RELATIVITY BETWEEN CONTENTS

CROSS REFERENCES TO RELATED APPLICATIONS

The present invention contains subject matter related to Japanese Patent Application JP 2006-066469, filed in the Japanese Patent Office on Mar. 10, 2006, the entire contents of which being incorporated herein by reference.

BACKGROUND OF THE INVENTION

1. Field of the Invention

The present invention relates to a device and a method for information processing, and a program, and particularly to a device and a method for information processing, and a program that can present information allowing efficient selection of contents to a user.

2. Description of the Related Art

In order to enable a user to select various contents (still images, moving images, music, Web documents and the like) efficiently, a method of retrieving a group of contents similar to a specific content specified by the user by matching by a TF/IDF method based on a space method or using a thesaurus has been put to practical use (see Japanese Patent Laid-Open No. Hei 3-172966. Herein after, referred as Patent Document 1). For example, a service that presents document information similar to an input text is available on the Internet (Webcat Plus (http://webcatplus.nii.ac.jp/)).

In addition, there is a method of labeling (extraction of a characteristic keyword) that groups and describes a plurality of contents (see Japanese Patent Laid-Open No. 2003-248686. Herein after referred as Patent Document 2).

Further, a service that clusters (classifies) results of search in response to a query (a representation of a processing request (inquiry) to a database management system as a character string) and then presents the results is also available on the Internet (Clusty (http://clusty.jp/)).

SUMMARY OF THE INVENTION

However, with the method in Patent Document 1, the user cannot recognize from what viewpoint the retrieved similar contents are judged to be "similar" to the specific content.

With the method in Patent Document 2, a plurality of contents are handled equivalently, and therefore indicating relativity of a content as an origin to contents associated with the content is not considered.

The information search based on a query is just a function of searching for related contents related to the word, and cannot select contents from an arbitrary viewpoint for a user because the word is specified by the user.

The present invention has been made in view of such a situation, and it is desirable to be able to retrieve contents associated with a particular content from an arbitrary viewpoint for a user, and detect and present also information indicating relativity of the retrieved contents to the particular content.

According to an embodiment of the present invention, there is provided an information processing device including: a generating section for generating, on a basis of a plurality of contents, extracted information extracted from content information of the plurality of contents, and values indicated by the extracted information for each of the contents, a numerical model of the contents and a numerical model of the extracted information in a same space of two dimensions or more; a calculating section for calculating degrees of association of sets of link destination candidate contents other than a predetermined link source content among the plurality of contents and the extracted information with the link source content, using the numerical model of the contents and the numerical model of the extracted information in the same space; a link detecting section for detecting a link destination content associated with the link source content and relativity information indicating relativity between the link destination content and the link source content on a basis of the degrees of association calculated by the calculating section; and a presenting section for presenting the link destination content and the relativity information detected by the link detecting section.

The link detecting means can set the link destination candidate content of the set having the degree of association higher than a threshold value as the link destination content, and set the extracted information of the set as the relativity information.

The presenting section can display the link destination content and the relativity information detected by the link detecting section.

The presenting section can display all or a part of content information of the link destination content in correspondence with display of the link destination content.

The presenting section can highlight a part corresponding to the relativity information in the content information displayed in correspondence with the display of the link destination content.

The presenting section can determine a form of display of one of the link destination content and the relativity information on the basis of the degrees of association.

The information processing device can further include a cluster generating section for generating clusters of the extracted information by grouping the extracted information, wherein the calculating section can convert the calculated degrees of association of the sets of the link destination candidate contents and the extracted information with the link source content into degrees of association corresponding to the clusters of the extracted information, and the link detecting section can set the link destination candidate content of the set having the degree of association higher than a threshold value, the degree of association corresponding to a cluster of the extracted information, as the link destination content, and set representative extracted information representative of the cluster of the extracted information of the set as the relativity information.

The information processing device can further include a cluster generating section for generating link destination candidate clusters of the link destination candidate contents by grouping the link destination candidate contents, wherein the calculating section can calculate degrees of association of sets of the link destination candidate clusters and the extracted information with the link source content, and the link detecting section can set a link destination candidate content belonging to the link destination candidate cluster of the set having the degree of association higher than a threshold value as the link destination content, and set the extracted information of the set as the relativity information.

The information processing device can further include an inputting section for inputting content information, wherein the generating means can reconstruct the model of the contents by generating a vector corresponding to extracted information of the content information input by the inputting means and adding the vector to the already generated numerical model of the contents.

According to an embodiment of the present invention, there is provided an information processing method including the steps of: generating, on a basis of a plurality of contents, extracted information extracted from content information of the plurality of contents, and values indicated by the extracted information for each of the contents, a numerical model of the contents and a numerical model of the extracted information in a same space of two dimensions or more; calculating degrees of association of sets of link destination candidate contents other than a predetermined link source content among the plurality of contents and the extracted information with the link source content, using the numerical model of the contents and the numerical model of the extracted information in the same space; detecting a link destination content associated with the link source content and relativity information indicating relativity between the link destination content and the link source content on a basis of the degrees of association calculated in a process of the calculating step; and presenting the link destination content and the relativity information detected in a process of the link detecting step.

According to an embodiment of the present invention, there is provided a program for making a computer perform a presenting process for presenting information indicating a content associated with a particular content, the presenting process including: a generating step of generating, on a basis of a plurality of contents, extracted information extracted from content information of the plurality of contents, and values indicated by the extracted information for each of the contents, a numerical model of the contents and a numerical model of the extracted information in a same space of two dimensions or more; a calculating step of calculating degrees of association of sets of link destination candidate contents other than a predetermined link source content among the plurality of contents and the extracted information with the link source content, using the numerical model of the contents and the numerical model of the extracted information in the same space; a link detecting step of detecting a link destination content associated with the link source content and relativity information indicating relativity between the link destination content and the link source content on a basis of the degrees of association calculated in a process of the calculating step; and a presenting step of presenting the link destination content and the relativity information detected in a process of the link detecting step.

The information processing device, the information processing method, or the program according to one embodiment of the present invention generates, on a basis of a plurality of contents, extracted information extracted from content information of the plurality of contents, and values indicated by the extracted information for each of the contents, a numerical model of the contents and a numerical model of the extracted information in a same space of two dimensions or more, calculates degrees of association of sets of link destination candidate contents other than a predetermined link source content among the plurality of contents and the extracted information with the link source content, using the numerical model of the contents and the numerical model of the extracted information in the same space, detects a link destination content associated with the link source content and relativity information indicating relativity between the link destination content and the link source content on a basis of the calculated degrees of association, and presents the detected link destination content and the detected relativity information.

According to the present invention, it is possible to detect a link destination content associated with a link source content and relativity information indicating relativity between the link destination content and the link source content on a basis of degrees of association of sets of link destination candidate contents and extracted information with the link source content, and present the link destination content and the relativity information.

BRIEF DESCRIPTION OF THE DRAWINGS

FIG. 3 is a diagram showing an example of a content-extracted information frequency matrix;

FIG. 5 is a diagram schematically showing a matrix as a model of contents;

FIG. 6 is a diagram schematically showing a matrix as a model of extracted information;

FIG. 7 is a diagram showing an example of the model of the contents;

FIG. 8 is a diagram showing an example of the model of the extracted information;

FIG. 9 is a diagram showing an example of degrees of association of sets of link destination candidate contents and the extracted information with a link source content;

FIG. 13 is a diagram of assistance in explaining clustering of the extracted information;

FIG. 14 is a diagram showing an example of degrees of association of sets of the link destination candidate contents and extracted information clusters with the link source content;

FIG. 19 is a diagram showing an example of degrees of association of sets of link destination candidate clusters and the extracted information with the link source content;

FIG. 21 is a diagram showing an example of degrees of association of sets of the link destination candidate clusters and the extracted information clusters with the link source content;

FIG. 23 is a diagram showing an example of degrees of association of sets of link destination candidate contents and the extracted information with another link source content;

FIG. 24 is a diagram showing an example of degrees of association of sets of the link destination candidate contents and the extracted information clusters with the other link source content; and FIG. 25 is a diagram showing an example of configuration of a personal computer.

DETAILED DESCRIPTION OF THE PREFERRED EMBODIMENTS

Preferred embodiments of the present invention will hereinafter be described. Correspondences between constitutional requirements of the present invention and embodiments in the specification or the drawings are illustrated as follows. This description is to confirm that embodiments supporting the present invention are described in the specification or the drawings. Therefore, even when there is an embodiment described in the specification or drawings but not described here as an embodiment corresponding to a constitutional requirement of the present invention, it does not signify that the embodiment does not correspond to the constitutional requirement. Conversely, even when an embodiment is described here as corresponding to a constitutional requirement, it does not signify that the embodiment does not correspond to constitutional requirements other than that constitutional requirement.

An information processing device according to an embodiment of the present invention includes: generating means (model generating unit 12 in FIG. 1, for example) for generating, on a basis of a plurality of contents, extracted information extracted from content information of the plurality of contents, and values indicated by the extracted information for each of the contents, a numerical model of the contents and a numerical model of the extracted information in a same space of two dimensions or more; calculating means (association degree calculating unit 14 in FIG. 1, for example) for calculating degrees of association of sets of link destination candidate contents other than a predetermined link source content among the plurality of contents and the extracted information with the link source content, using the numerical model of the contents and the numerical model of the extracted information in the same space; link detecting means (link detecting unit 15 in FIG. 1, for example) for detecting a link destination content associated with the link source content and relativity information indicating relativity between the link destination content and the link source content on a basis of the degrees of association calculated by the calculating means; and presenting means (presenting unit 16 in FIG. 1, for example) for presenting the link destination content and the relativity information detected by the link detecting means.

Figure 2:
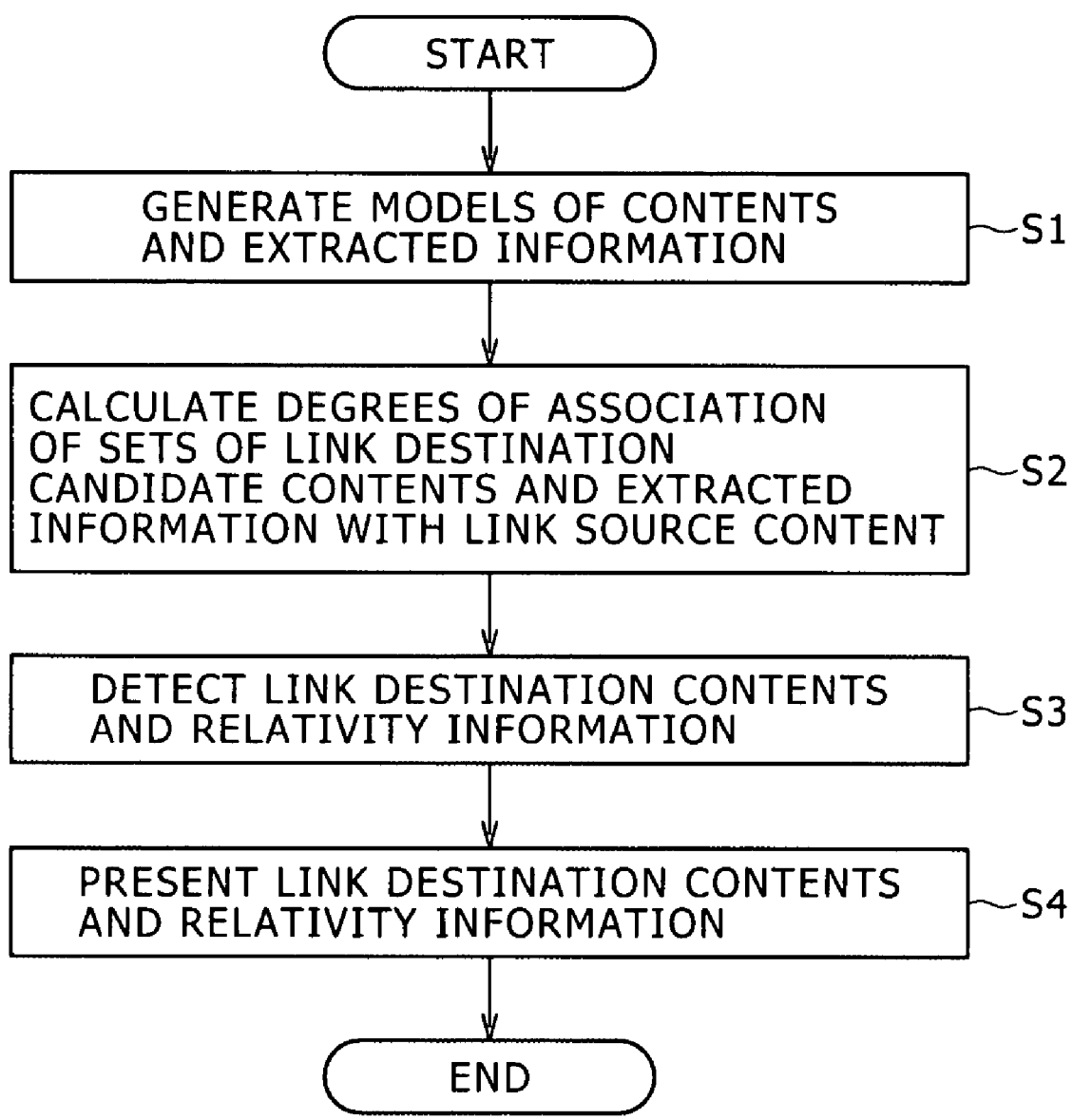
FIG. 2 is a flowchart of assistance in explaining a presenting process of the information processing device 1 of FIG. 1.

The link detecting means can set the link destination candidate content of the set having the degree of association higher than a threshold value as the link destination content, and set the extracted information of the set as the relativity information (step S3 in FIG. 2, for example).

Figure 10:
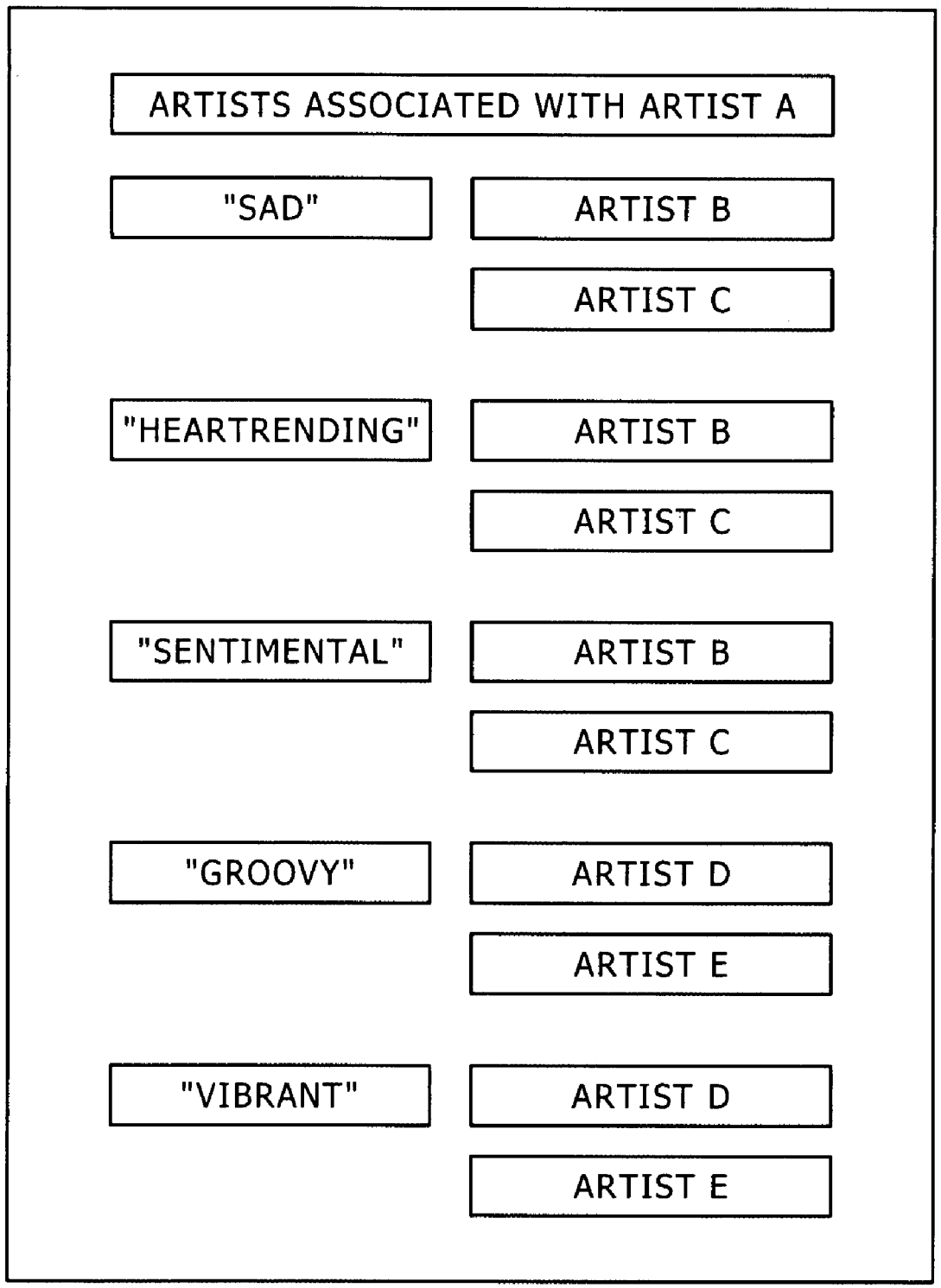
FIG. 10 is a diagram showing an example of display of link destination contents and relativity information.

The presenting means can display the link destination content and the relativity information detected by the link detecting means (step S4 in FIG. 2, for example) (FIG. 10, for example).

Figure 11:
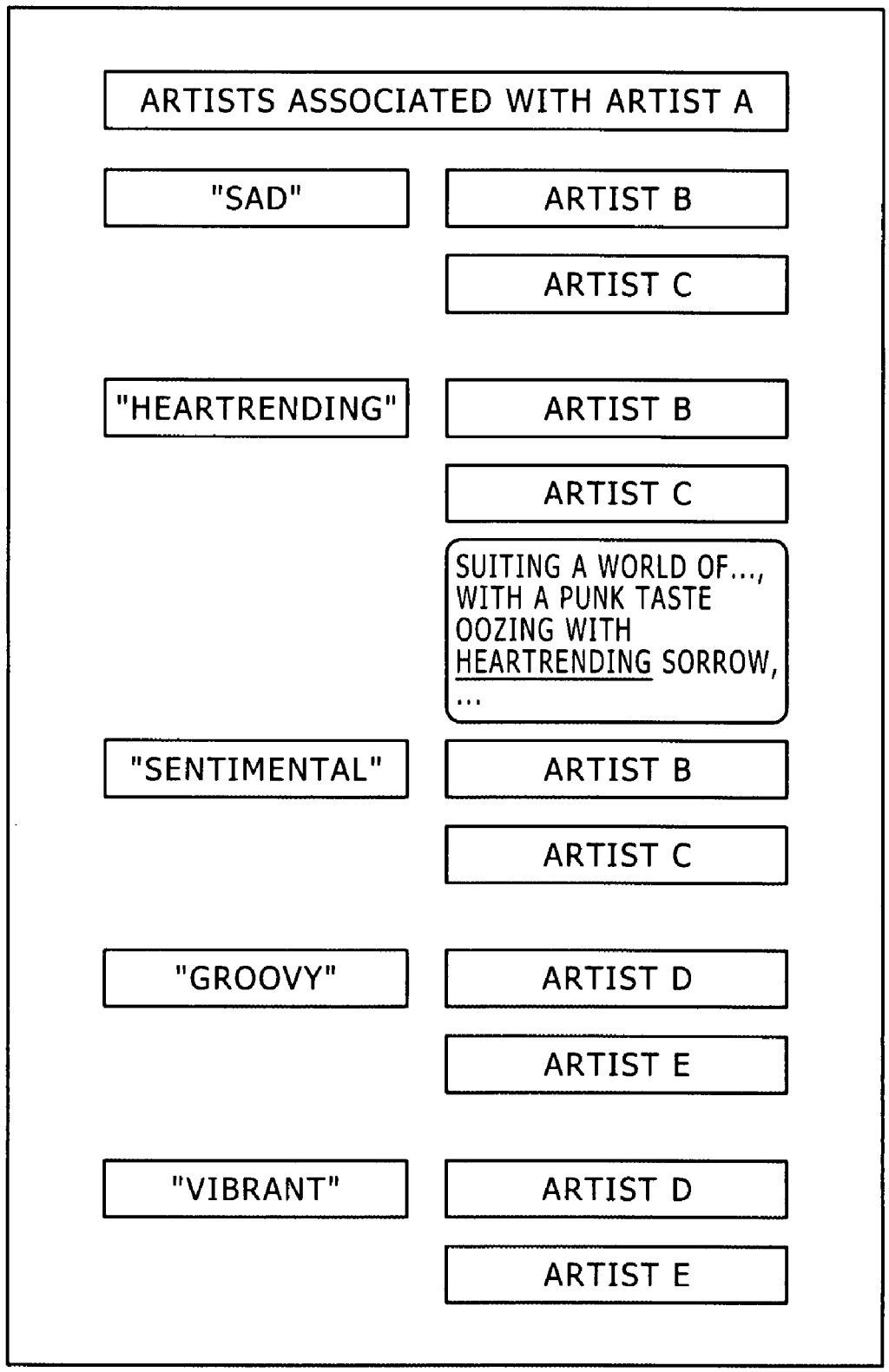
FIG. 11 is a diagram showing another example of display of the link destination contents and the relativity information.

The presenting means can display all or a part of content information of the link destination content in correspondence with display of the link destination content (FIG. 11, for example).

The presenting means can highlight a part corresponding to the relativity information in the content information displayed in correspondence with the display of the link destination content (FIG. 11, for example).

The presenting means can determine a form of display of one of the link destination content and the relativity information on the basis of the degrees of association (FIG. 11, for example).

Figures 15, 16:
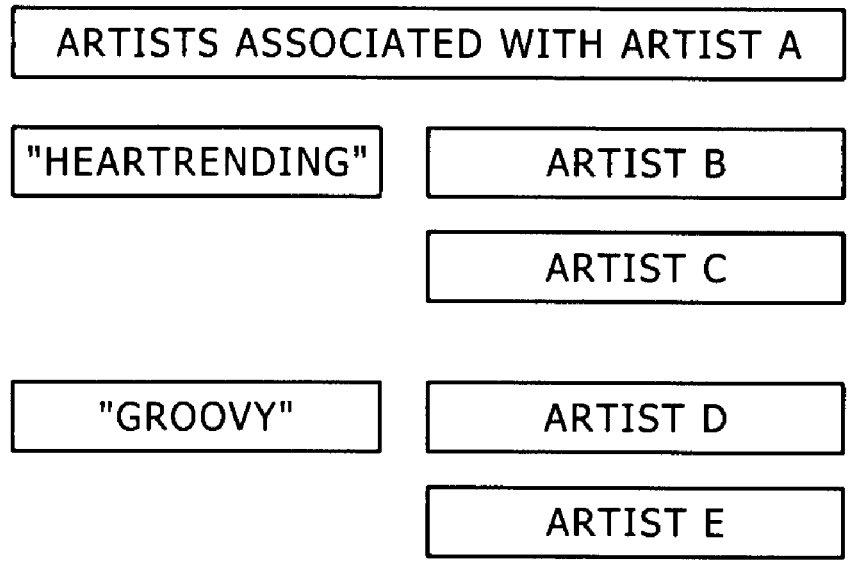
FIG. 15 is a diagram showing an example of display of other link destination contents and relativity information.
FIG. 16 is a diagram showing an example of degrees of association of the extracted information clusters with the link source content.

The information processing device can further include cluster generating means (extracted information cluster generating unit 21 in FIG. 12, for example) for generating clusters of the extracted information by grouping the extracted information, wherein the calculating means can convert the calculated degrees of association of the sets of the link destination candidate contents and the extracted information with the link source content into degrees of association corresponding to the clusters of the extracted information (FIG. 14, for example), and the link detecting means can set the link destination candidate content of the set having the degree of association higher than a threshold value, the degree of association corresponding to a cluster of the extracted information, as the link destination content, and set representative extracted information representative of the cluster of the extracted information of the set as the relativity information (FIG. 15, for example).

Figure 20:
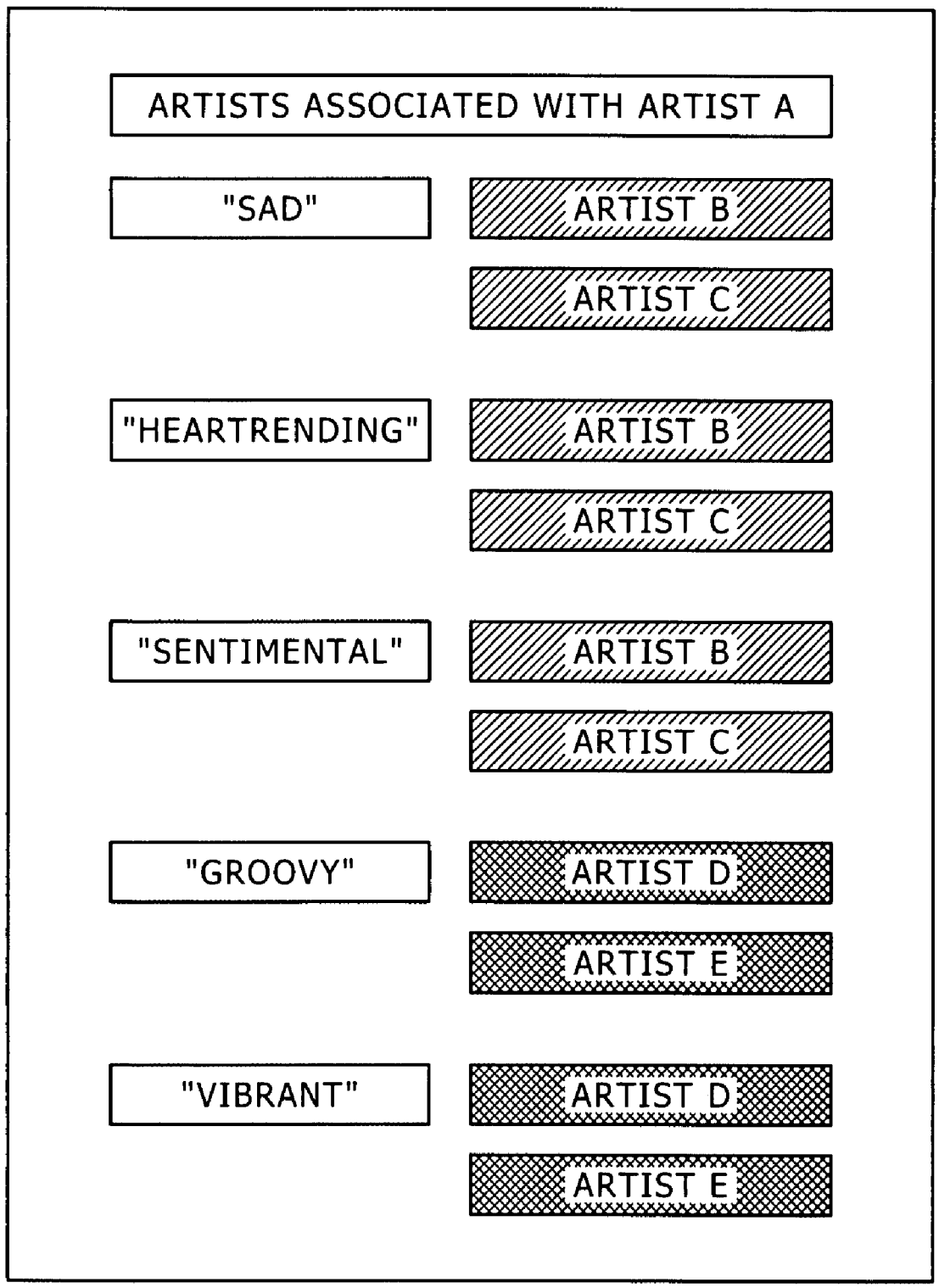
FIG. 20 is a diagram showing another example of display of link destination contents and relativity information.

The information processing device can further include cluster generating means (content cluster generating unit 31 in FIG. 17, for example) for generating link destination candidate clusters of the link destination candidate contents by grouping the link destination candidate contents, wherein the calculating means can calculate degrees of association of sets of the link destination candidate clusters and the extracted information with the link source content (FIG. 19, for example), and the link detecting means can set a link destination candidate content belonging to the link destination candidate cluster of the set having the degree of association higher than a threshold value as the link destination content, and set the extracted information of the set as the relativity information (FIG. 20, for example).

The information processing device can further include inputting means (content information inputting unit 41, for example) for inputting content information, wherein the generating means can reconstruct the model of the contents by generating a vector corresponding to extracted information of the content information input by the inputting means and adding the vector to the already generated numerical model of the contents.

An information processing method or a program according to an embodiment of the present invention includes the steps of: (step S1 in FIG. 2, for example) generating, on a basis of a plurality of contents, extracted information extracted from content information of the plurality of contents, and values indicated by the extracted information for each of the contents, a numerical model of the contents and a numerical model of the extracted information in a same space of two dimensions or more; (step S2 in FIG. 2, for example) calculating degrees of association of sets of link destination candidate contents other than a predetermined link source content among the plurality of contents and the extracted information with the link source content, using the numerical model of the contents and the numerical model of the extracted information in the same space; (step S3 in FIG. 2, for example) detecting a link destination content associated with the link source content and relativity information indicating relativity between the link destination content and the link source content on a basis of the degrees of association calculated in a process of the calculating step; and (step S4 in FIG. 2, for example) presenting the link destination content and the relativity information detected in a process of the link detecting step.

Figure 1:
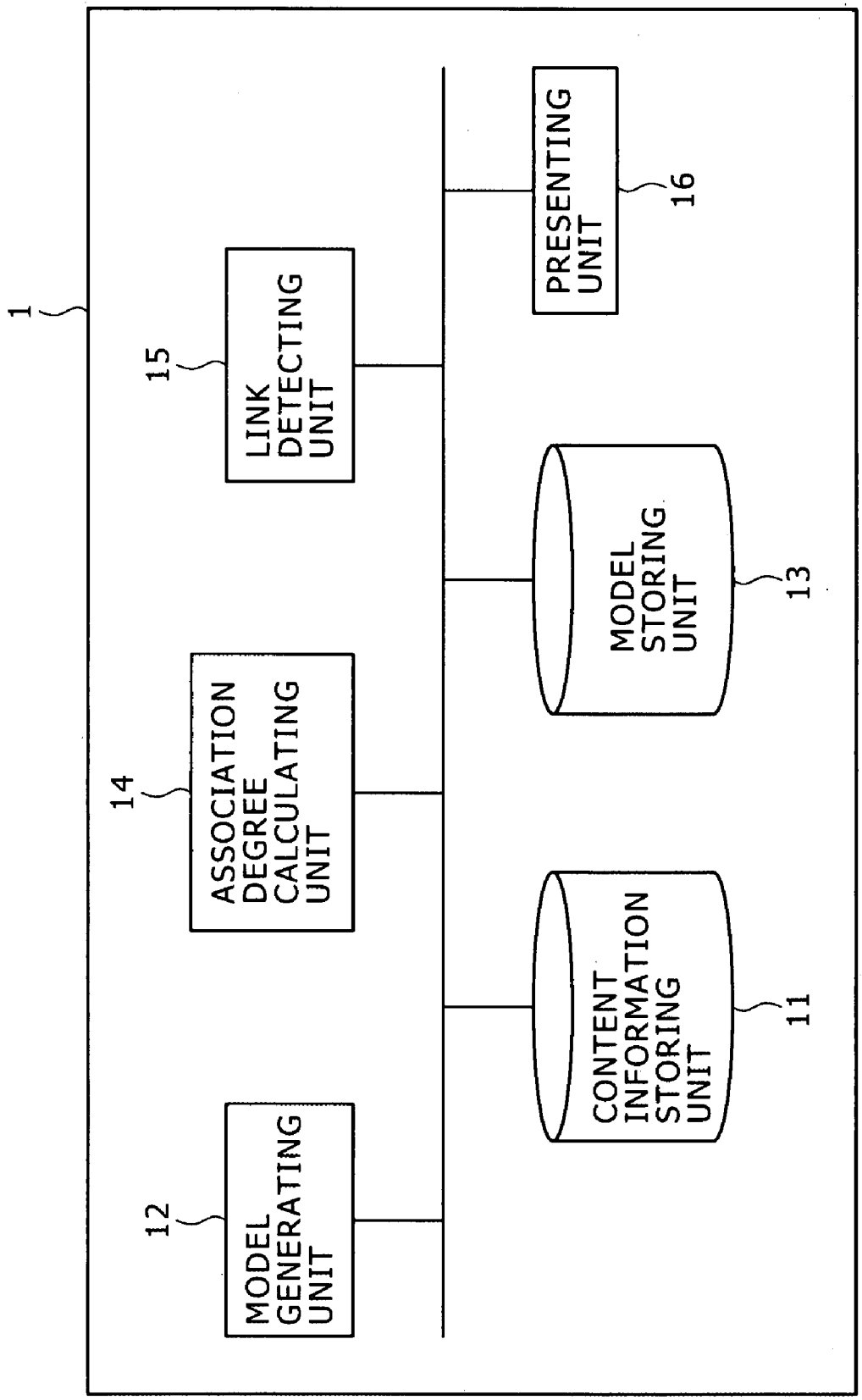
FIG. 1 is a block diagram showing an example of configuration of an information processing device to which an embodiment of the present invention is applied.

FIG. 1 shows an example of configuration of an information processing device 1 to which an embodiment of the present invention is applied. The information processing device 1 generates information for efficient selection of contents by a user, and provides the information.

A content information storing unit 11 stores information on contents useable by the user (hereinafter referred to as content information), for example, for each of the contents.

In this case, the contents may be public contents or private contents, and include still pictures, moving images of television broadcast programs, movies or the like, music, Web pages, documents (text in natural languages) or the like.

The content information is for example EPG (Electric Program Guide) information when contents are for example television broadcast programs, text of reviews of works or artists, or feature quantities representing contents (for example musical feature quantities such as a tempo, rhythm and the like, or image information such as color, texture, and the like) when the contents are movies, images, or music, comment text attached to still pictures when contents are the still pictures, and text parts of contents on Web pages when contents are the Web pages.

When contents are text, the text itself can be set as content information. That is, the contents themselves can be content information. Further, metadata such as the names of writers, keywords and the like attached to contents proper can be set as content information.

Incidentally, in this case, a plurality of contents associated with each other on a certain criterion, such for example as a plurality of contents associated with a same individual or group, can be handled as one content.

A model generating unit 12 models (numerically represents) the contents and extracted information on the basis of frequencies of extraction from the content information of the extracted information extracted from all or parts of the content information stored in the content information storing unit 11. The model generating unit 12 stores a model of the contents and a model of the extracted information, which models are obtained as a result of the modeling, in a model storing unit 13.

When the content information is text, the extracted information is words or phrases appearing in the text or metadata (genres, birthplaces of artists and the like). In addition, the extracted information can be predetermined symbols or images. That is, the extracted information is arbitrary as long as the extracted information can be discretely differentiated from other information. Further, in place of expressions and the like that actually appear, other expressions substituted for the expressions and the like that actually appear can be set as extracted information, or expressions can be ranked on the basis of a certain criterion so that only the expressions ranking high are set as extracted information.

A association degree calculating unit 14 calculates degrees of association indicating degrees to which a predetermined content (hereinafter referred to as a link source content) (for example a particular content specified by the user among the contents useable by the user) and contents other than the link source content (which contents will hereinafter be referred to as link destination candidate contents) (for example contents other than the link source content among the contents useable by the user) are associated with each other as viewed from the extracted information (in other words, the association degree calculating unit 14 calculates degrees of association indicating degrees to which the link source content and the extracted information are associated with each other as viewed from the link destination candidate contents) on the basis of the model of the contents and the model of the extracted information which models are stored in the model storing unit 13.

That is, a degree of association is detected for each set of the link source content, a link destination candidate content, and extracted information. This degree of association will hereinafter be referred to as the degree of association of the link destination candidate content and the extracted information with the link source content as appropriate.

A link detecting unit 15 for example detects the link destination candidate content of a set having a high value as a degree of association among the degrees of association calculated by the association degree calculating unit 14 as a content having a high relativity to the link source content (the content having a high relativity to the link source content will hereinafter be referred to as a link destination content), and detects the extracted information of the set as information indicating the relativity between the link destination content and the link source content (which information will hereinafter be referred to as relativity information). Incidentally, the extracted information itself indicating the relativity between the link destination content and the link source content can be set as relativity information, or another expression substituted for the extracted information can be set as relativity information.

A presenting unit 16 for example generates a display screen displaying the name or the like of the link destination content and the relativity information detected by the link detecting unit 15, and then displays the display screen on a display unit not shown in the figure, thus presenting the link destination content and the relativity information to the user.

That is, in the present invention, for example the link destination content having a relativity to the content (link source content) specified by the user and the relativity information indicating the relativity between the link destination content and the link source content are detected and presented. Thus, the user can grasp the relativity between the presented link destination content and the link source content from the relativity information.

In addition, the relativity information corresponds to the extracted information of the content information, and is not set by the user. The link destination content is therefore detected from an arbitrary viewpoint for the user.

Incidentally, the content data itself may be possessed by the information processing device 1, or may be possessed by another device.

A presenting process in the information processing device 1 will next be described with reference to a flowchart of FIG. 2.

In step S1, the model generating unit 12 models (numerically represents) contents and extracted information on the basis of frequencies of extraction from content information of the extracted information extracted from all or parts of the content information stored in the content information storing unit 11. The model generating unit 12 stores a model of the contents and a model of the extracted information, which models are obtained as a result of the modeling, in the model storing unit 13.

In the present invention, the model of the contents and the model of the extracted information are generated in the same space.

The model of the contents and the model of the extracted information can be generated in the same space using LSA (Latent Semantic Analysis), for example. LSA is described in detail in the following literature.

S. C. Deerwester, S. T. Dumais, T. K. Landauer, G. W. Furnas, and R. A. Harshman, "Indexing by Latent Semantic Analysis", Journal of the American Society of Information Science, 41 (6): 391-407, 1990.

Describing a modeling process in this case by taking LSA as an example, first the contents are set as row items and the extracted information is set as column items. Then a matrix (hereinafter referred to as a content-extracted information frequency matrix) X having frequencies of extraction of the extracted information from each content (content information of each content) as matrix elements is obtained. That is, when there are Nc contents and Nw pieces (kinds) of extracted information, the content-extracted information frequency matrix X is an (Nc×Nw) matrix.

For example, a content-extracted information frequency matrix X as shown in FIG. 3 is obtained when the contents are musical pieces, a group of musical pieces by a same artist are handled as one content, the content information is text of reviews of the artist, the reviews accompanying the contents (a group of contents to be exact), and the extracted information is words appearing in the review texts.

In the content-extracted information frequency matrix X shown in FIG. 3, the row items are five (=Nc) items of artists A to E, the column items are items of six words (extracted information) appearing in the review texts (content information) accompanying the contents of the artists, and matrix elements are frequencies of extraction of the words from each of the review texts.

Next, the thus obtained content-extracted information frequency matrix X is subjected to singular value decomposition as shown in Equation (1).

[Equation 1]

$$X = USV^t \quad (1)$$

Figure 4:
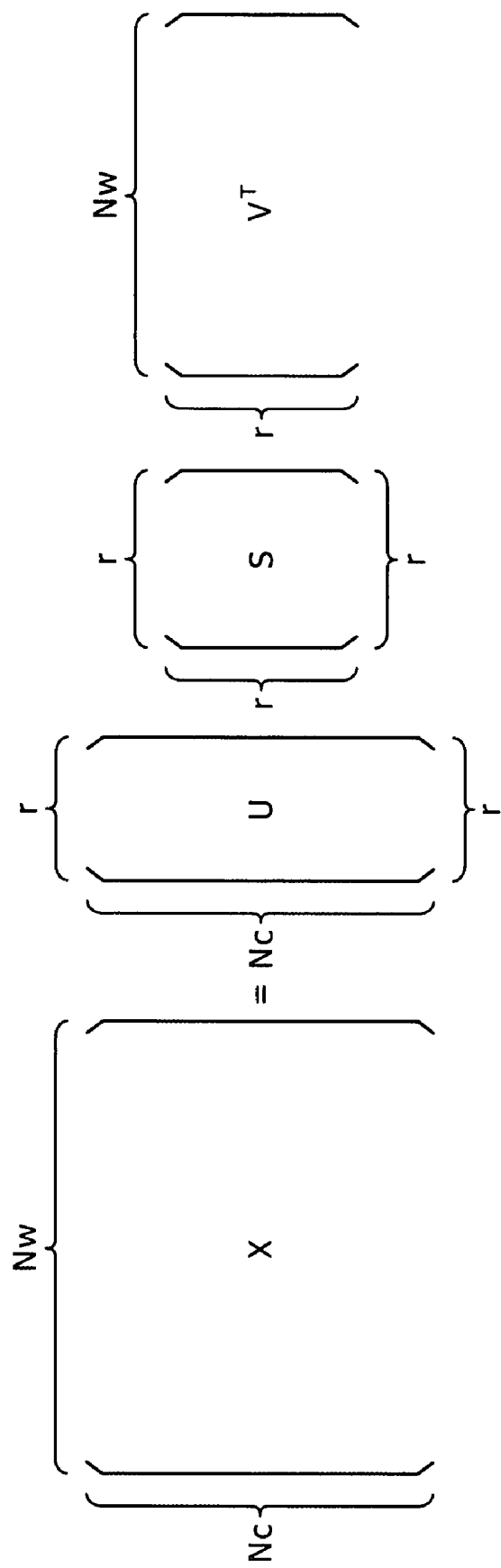
FIG. 4 is a diagram schematically showing the singular value decomposition of the content-extracted information frequency matrix.

In Equation (1), U is an Nc×r (=the rank of the matrix X) matrix, S is a r×r matrix in which diagonal elements are arranged in descending order of singular values, and $V^T$ is a r×Nw matrix. Incidentally, the matrices of Equation (1) are schematically shown in FIG. 4.

Next, Equation (2) and Equation (3) are calculated using the matrix U, the matrix S, and the matrix V obtained as a result of subjecting the content-extracted information frequency matrix X to singular value decomposition. A matrix D (a matrix in which row items are the items of the contents) reduced to m dimensions is obtained as the model of the contents, and a matrix W (a matrix in which row items are the items of the extracted information) reduced to m dimensions is obtained as the model of the extracted information.

[Equation 2]

$$D = U_m S_m^{1/2} \quad (2)$$

[Equation 3]

$$W = V_m S_m^{1/2} \quad (3)$$

In Equation (2) and Equation (3), Um is a submatrix from the first column to the mth column of the matrix U, Vm is a submatrix from the first column to the mth column of the matrix V, and $S_m^{1/2}$ is a submatrix from the first column to the mth column of the diagonal matrix S and takes a square root of each element of S. Incidentally, Equation (2) and Equation (3) are schematically shown in FIG. 5 and FIG. 6.

For example, when the content-extracted information frequency matrix X shown in FIG. 3 is subjected to singular value decomposition with m=3, and Equation (2) and Equation (3) are calculated using the matrix U, the matrix S, and the matrix V obtained as a result of subjecting the content-extracted information frequency matrix X to the singular value decomposition, the matrix D of three dimensions shown in FIG. 7 is obtained as the model of the contents, and the matrix W of three dimensions shown in FIG. 8 is obtained as the model of the extracted information.

Thus the model of the contents and the model of the extracted information in the same space compressed to m dimensions (that is, the model of the contents and the model of the extracted information defined by a plurality of same attributes) are generated. The generated models are stored in the model storing unit 13.

Incidentally, while the above description has been made of a case where LSA is used to generate the model of the contents and the model of the extracted information in the same space, correspondence analysis or PLSA (Probabilistic Latent Semantic Analysis) can be used to generate the model of the contents and the model of the extracted information in the same space.

In the case of correspondence analysis, as in LSA, the contents and the extracted information are vectorized into an Euclidean space. In the case of PLSA, the contents are represented by a conditional probability P(z|d), where z is a latent random variable, and z=z1, z2, . . . , whereby the conditional probability can be treated as a vector as an expression.

Details of PLSA are described in the following literature, for example.

Hofmann, T., "Probabilistic Latent Semantic Analysis", Proc. of Uncertainty in Artificial Intelligence, 1999.

Returning to FIG. 2, in next step S2, the association degree calculating unit 14 calculates degrees of association of sets of link destination candidate contents and the extracted information with a link source content (degrees of association indicating degrees to which the link source content and the link destination candidate contents are associated with each other as viewed from the extracted information, or degrees of association indicating degrees to which the link source content and the extracted information are associated with each other as viewed from the link destination candidate contents) on the basis of the model of the contents (FIG. 7) and the model of the extracted information (FIG. 8) which models are stored in the model storing unit 13.

When the contents and the extracted information are modeled by LSA, supposing that the link source content is an ith content (hereinafter referred to as a link source content Ci) as viewed from the first row item of the content-extracted information frequency matrix X, a degree of association fi(hj, ck) of a set of a kth (k≠ i) link destination candidate content (hereinafter referred to as a link destination candidate content Ck) as viewed from the first row item of the matrix X and jth extracted information (hereinafter referred to as extracted information Hj) as viewed from the first column item of the matrix X with the link source content Ci is obtained as shown by Equation (4).

[Equation 4]

$$f_i(h_j, c_k) = \frac{w_j \cdot d_k \cdot w_j \cdot d_k}{|w_j||d_k||w_j||d_i|} \quad (4)$$

In Equation (4), a vector di or dk is the ith or kth row vector (a group of elements corresponding to each column item for the ith or kth row item) of the matrix D (Equation (2)) (FIG. 7), and a vector wj is the jth row vector of the matrix W (Equation (3)) (FIG. 8).

That is, a result of multiplying together a degree of cosine similarity between the extracted information vector and the link destination candidate content vector and a degree of cosine similarity between the extracted information vector and the link source content vector is the degree of association $f_i(h_j, c_k)$.

FIG. 9 shows degrees of association of sets of link destination candidate contents and the extracted information with the link source content when the matrix D and the matrix W are the matrices shown in FIG. 7 and FIG. 8 and the link source content is the content of the artist A. Since a high degree of association represents a high relativity, the relativities of the sets of the link destination candidate contents and the extracted information with the link source content are ranked by the calculation in this step.

Incidentally, when the contents and the extracted information are modeled by PLSA or the like (that is, when probability expression is made), a joint probability (Equation (5)), a conditional probability (Equation (6)) or the like can be set as the degree of association.

[Equation 5]
$$f_i(w_j, d_k) = P(d_i, w_j, d_k) \\ = \sum_z P(d_i \mid z)P(w_j \mid z)P(d_k \mid z)P(z) \quad (5)$$

[Equation 6]
$$f_i(w_j, d_k) = P(d_i \mid w_j, d_k) \quad (6) \\ = \frac{P(d_i, w_j, d_k)}{P(w_j, d_k)} \\ = \frac{\sum_z P(d_i \mid z)P(w_j \mid z)P(d_k \mid z)P(z)}{\sum_z P(w_j \mid z)P(d_k \mid z)P(z)}$$

In next step S3, referring to the degrees of association obtained in step S2, the link detecting unit 15 detects the link destination candidate content of the set of the link destination candidate content and extracted information which set has a high degree of association as a link destination content (content having a high relativity to the link source content), and detects the extracted information of the set as relativity information (information describing the relativity between the link source content and the link destination content).

Specifically, the link destination candidate contents of the sets having a degree of association equal to or higher than a predetermined threshold value are detected as link destination contents, and the extracted information of the sets is detected as relativity information.

For example, when the degrees of association shown in FIG. 9 are obtained, supposing that the threshold value for the degrees of association is 0.5, the sets having a degree of association equal to or higher than the threshold value are as follows.

(sad, the artist B), (sad, the artist C),
(heartrending, the artist B), (heartrending, the artist C)
(sentimental, the artist B), (sentimental, the artist C)
(groovy, the artist D), (groovy, the artist E)
(vibrant, the artist D), and (vibrant, the artist E)

Therefore "artist B", "artist C", "artist D", and "artist E" are detected as link destination contents, while "sad", "heartrending", and "sentimental" are detected as relativity information corresponding to "artist B" and "artist C", and "groovy" and "vibrant" are detected as relativity information corresponding to "artist D" and "artist E".

In next step S4, the presenting unit 16 presents the link destination contents and the relativity information detected in step S3 to the user.

Specifically, the presenting unit 16 for example generates a display screen for displaying the link destination contents and the relativity information, and then displays the display screen on a display unit not shown in the figure.

FIG. 10 shows an example of display of the link destination contents and the relativity information detected on the basis of the degrees of association shown in FIG. 9 when the threshold value is set at 0.5.

In this example, as contents associated with a musical piece of "artist A" (link source content), the names and the like of "artist B" and "artist C" are displayed so as to correspond to each of "sad", "heartrending", and "sentimental", and the names and the like of "artist D" and "artist E" are displayed so as to correspond to each of "groovy" and "vibrant".

Thus, the user can grasp that the musical pieces of "artist B" and "artist C" are associated with the musical piece of "artist A" in the meanings of the words "sad", "heartrending", and "sentimental", and that the musical pieces of "artist D" and "artist E" are associated with the musical piece of "artist A" in the meanings of the words "groovy" and "vibrant".

As a result, for example, in a case where the musical piece of "artist A" that the user is listening to now is the link source content, when the user desires to listen to "sad" music (music at a slow tempo, for example) next, the user can select the musical piece of "artist B" or "artist C". When the user desires to listen to "groovy" music (music at a fast tempo, for example) next, the user can select the musical piece of "artist D" or "artist E".

Incidentally, when. one piece of relativity information is associated with a plurality of contents, a method of presenting the contents can be determined according to the degrees of association. In the example of FIG. 10, "artist B" and "artist C" are associated with "sad", "heartrending", and "sentimental", and "artist D" and "artist E" are associated with "groovy" and "vibrant". A content having a higher degree of association with each piece of relativity information is displayed first (on an upper side).

For example, the degree of association of "sad" with "artist B" (0.77) is higher than the degree of association of "sad" with "artist C" (0.72). Thus, "artist B" is displayed above "artist C" so as to correspond to "sad".

In the example of FIG. 10, only the link destination contents are displayed in correspondence with the relativity information. However, the content information of a link destination content can be displayed when the link destination content is selected (when a focus is on the link destination content). Further, information corresponding to the relativity information in the content information can be highlighted.

For example, when "artist C" displayed in correspondence with "heartrending" is selected in the example of FIG. 10, as shown in FIG. 11, the text of a review (content information) of "artist C" is displayed below the selected "artist C", and the word ("heartrending") corresponding to "heartrending" as relativity information in the review text is highlighted (underlined).

Incidentally, the word can be highlighted by not only an underline but also bold letters, different character colors, animation and the like.

In addition, instead of being displayed when the link destination content is selected, the content information can be displayed from the beginning for each link destination content. Incidentally, in this case, all of the content information may be displayed, or only a part including information corresponding to relativity information (for example a part including a word corresponding to the relativity information and several words preceding and following the word) may be displayed.

Further, instead of arranging and displaying the relativity information and the link destination contents such that the relativity information and the link destination contents correspond to each other as shown in FIG. 10, it is possible to generate and present a message such for example as "How about 'artist B' and 'artist C' with a feeling of 'heartrending' sorrow?".

The presenting process is performed as described above.

The degrees of association of the sets of the link destination candidate contents and the extracted information with the link source content are thus calculated. It is therefore possible to detect link destination contents having a high relativity to the link source content and simultaneously detect the relativity information indicating the relativities between the link destination contents and the link source content, and present the link destination contents and the relativity information. The user can thereby grasp the relativities between the presented link destination contents and the link source content from the relativity information.

In addition, the relativity information corresponds to the extracted information extracted from the content information, and is not set by the user. The link destination contents are therefore detected from an arbitrary viewpoint for the user.

Incidentally, in the examples of FIG. 3, FIG. 7, FIG. 8, and FIG. 9, the content information is review text. However, review text is a mere example, and the content information may be other than review text.

Figure 12:
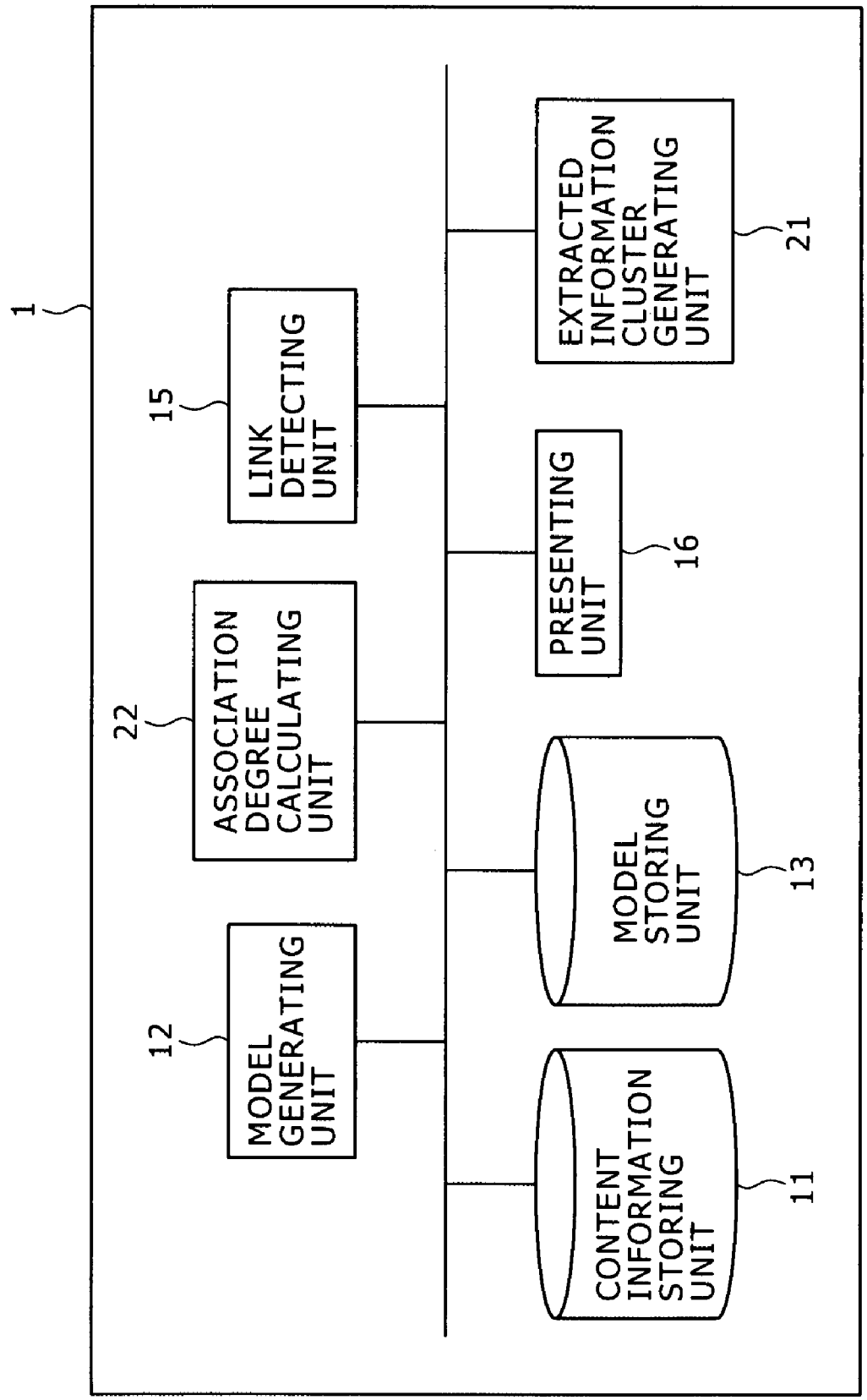
FIG. 12 is a block diagram showing an example of configuration of another information processing device to which an embodiment of the present invention is applied.

FIG. 12 shows an example of configuration of another information processing device 1 to which the present invention is applied. This information processing device 1 is formed by further providing an extracted information cluster generating unit 21 and providing an association degree calculating unit 22 in place of the association degree calculating unit 14 in the information processing device 1 of FIG. 1. Other parts are the same as in the information processing device 1 of FIG. 1, and therefore description thereof will be omitted as appropriate.

For example, in displaying presenting information, there are cases where an amount of the presenting information is desired to be reduced because of the limited size of a display area. In addition, there are cases where more efficient presenting information is desired.

Accordingly the information processing device 1 reduces an amount of presenting information to be presented finally by classifying extracted information on the basis of a predetermined criterion.

The extracted information cluster generating unit 21 groups the extracted information on the basis of the meanings or model of the extracted information, and thereby generates extracted information clusters.

For example, when the extracted information is words, words within a certain range of notational variations or words with subtle differences in a vocabulary are grouped into one. When the extracted information is metadata, highly correlated metadata is grouped into one.

The extracted information cluster generating unit 21 also determines extracted information (hereinafter referred to as representative extracted information) representative of the generated clusters.

When the extracted information is words, for example, a center of a cluster is defined in a space as in a k-means method, and a word closest to the center of the cluster represents the cluster and is set as representative extracted information. In this case, a word that does not actually appear in the content information may be the representative extracted information.

Incidentally, it is possible to generate clusters on the basis of a general or domain-limited thesaurus prepared in advance, and set a word positioned at a higher concept level, for example, as representative extracted information. In addition, without limitation to these methods, the word may be replaced with an expression by human hands.

As with the association degree calculating unit 14 in FIG. 1, the association degree calculating unit 22 calculates degrees of association of sets of link destination candidate contents and extracted information with a link source content (FIG. 9).

The association degree calculating unit 22 also converts the calculated degrees of association of the sets of the link destination candidate contents and the extracted information with the link source content in such a manner as to correspond to the clusters generated by the extracted information cluster generating unit 21.

Specifically, Equation (7) is calculated.

[Equation 7]
$$\sum_q T_{qp} R^i_{qk} \qquad (7)$$

In Equation (7), R is an (Nc−1)×Nw matrix (FIG. 9) showing the degrees of association of the sets of the link destination candidate contents and the extracted information with the link source content. T is an Nw×Nkw matrix in which the extracted information are row items, the clusters are column items, and row elements are obtained by Equation (8). Nkw is a total number of clusters (representative extracted information).

[Equation 8]
$$t_{pq} = \begin{cases} t_{pq} & w_q \to k_{wp} \\ 0 & \text{otherwise} \end{cases} \qquad (8)$$

In Equation (8), t is a nonzero positive value, and is a predetermined value corresponding to p and q when a weight is assigned in the replacement and is one otherwise.

For example, when clustering is performed on the extracted information modeled as shown in FIG. 8, so that "sad", "heartrending", and "sentimental" are included in a cluster 1, "groovy" and "vibrant" are included in a cluster 2, and "pure" is included in a cluster 3, a matrix T in which elements are binary values of 1 or 0 as shown in FIG. 13 is obtained. Incidentally, when weights are assigned to correspondences between the extracted information and the representative extracted information, the elements assume a predetermined value.

Then, when Equation (7) is calculated on the basis of this matrix T and the matrix R in FIG. 9, degrees of association corresponding to the extracted information clusters as shown in FIG. 14 are obtained. Incidentally, in the examples of FIG. 13 and FIG. 14, the representative extracted information of the cluster 1, the cluster 2, and the cluster 3 is "heartrending", "groovy", and "pure".

Thus, the degrees of association of the sets of the link destination candidate contents and the extracted information with the link source content (FIG. 9) are converted into the degrees of association corresponding to the extracted information clusters (that is, the degrees of association of sets of the link destination candidate contents and the extracted information clusters with the link source content) (FIG. 14).

Returning to FIG. 12, the link detecting unit 15 detects the link destination candidate contents of sets having a high degree of association among the degrees of association of the sets of the link destination candidate contents and the extracted information clusters with the link source content (FIG. 14), the degrees of association being calculated by the association degree calculating unit 22, as link destination contents, and detects the representative extracted information of the clusters of the sets as relativity information.

Specifically, when the degrees of association shown in FIG. 14 are obtained, supposing that a threshold value for the degrees of association is 0.5, the sets having a degree of association equal to or higher than the threshold value are as follows.

(heartrending, the artist B), (heartrending, the artist C),
(groovy, the artist D), and (groovy, the artist E)

Therefore "artist B", "artist C", "artist D", and "artist E" are detected as link destination contents, while "heartrending" is detected as relativity information corresponding to "artist B" and "artist C", and "groovy" is detected as relativity information corresponding to "artist D" and "artist E".

As in FIG. 1, the presenting unit 16 for example generates a display screen for displaying the names or the like of the link destination contents and the relativity information detected by the link detecting unit 15, and then displays the display screen on a display unit not shown in the figure, thereby presenting the link destination contents and the relativity information to the user.

FIG. 15 shows an example of display of the link destination contents and the relativity information detected on the basis of the degrees of association in FIG. 14. An amount of information in FIG. 15 is smaller than that of the presented information in FIG. 10.

Incidentally, in the above, the link destination contents and the relativity information are detected on the basis of the degrees of association in FIG. 14. However, it is possible to first calculate the degrees of association of the extracted information clusters with the link source content as shown in FIG. 16 by calculating Equation (9), then detect the relativity information ("heartrending" and "groovy", the threshold value being 0.5), and detect the link destination candidate contents ("artist B", "artist C", "artist D", and "artist E") having degrees of association higher than the threshold value as link destination contents, referring to the degrees of association corresponding to the clusters having the relativity information detected in this case as representative extracted information thereof among the degrees of association of the sets of the link destination candidate contents and the extracted information clusters (FIG. 14).

[Equation 9]

$$\frac{1}{N_c - 1} \sum_k \sum_q T_{pq} R_{qk}^i \quad (9)$$

When the degrees of association of the extracted information (or the clusters of the extracted information) with the link source content as shown in FIG. 16 are calculated, a method of presenting the relativity information can be determined according to the degrees of association. In the example of FIG. 15, "heartrending" is displayed preceding "groovy" (above "groovy").

According to the example of FIG. 16, the degree of association of "heartrending" with the link source content (1.17) is higher than the degree of association of "groovy" with the link source content (0.72). Thus, in FIG. 15, "heartrending" is displayed above "groovy".

As described above, since the extracted information is clustered, and the degrees of association corresponding to the extracted information clusters are obtained, an amount of presenting information can be reduced properly.

In addition, in the present invention, the model of contents and the model of extracted information are generated in the same space, and a degree of association with the link source content is calculated for each set of a link destination candidate content and extracted information (FIG. 9). Therefore, even when the extracted information is clustered, the degrees of association corresponding to the extracted information clusters can be readily calculated from the degrees of association of the sets of the link destination candidate contents and the extracted information with the link source content (Equation (7), for example).

Figure 17:
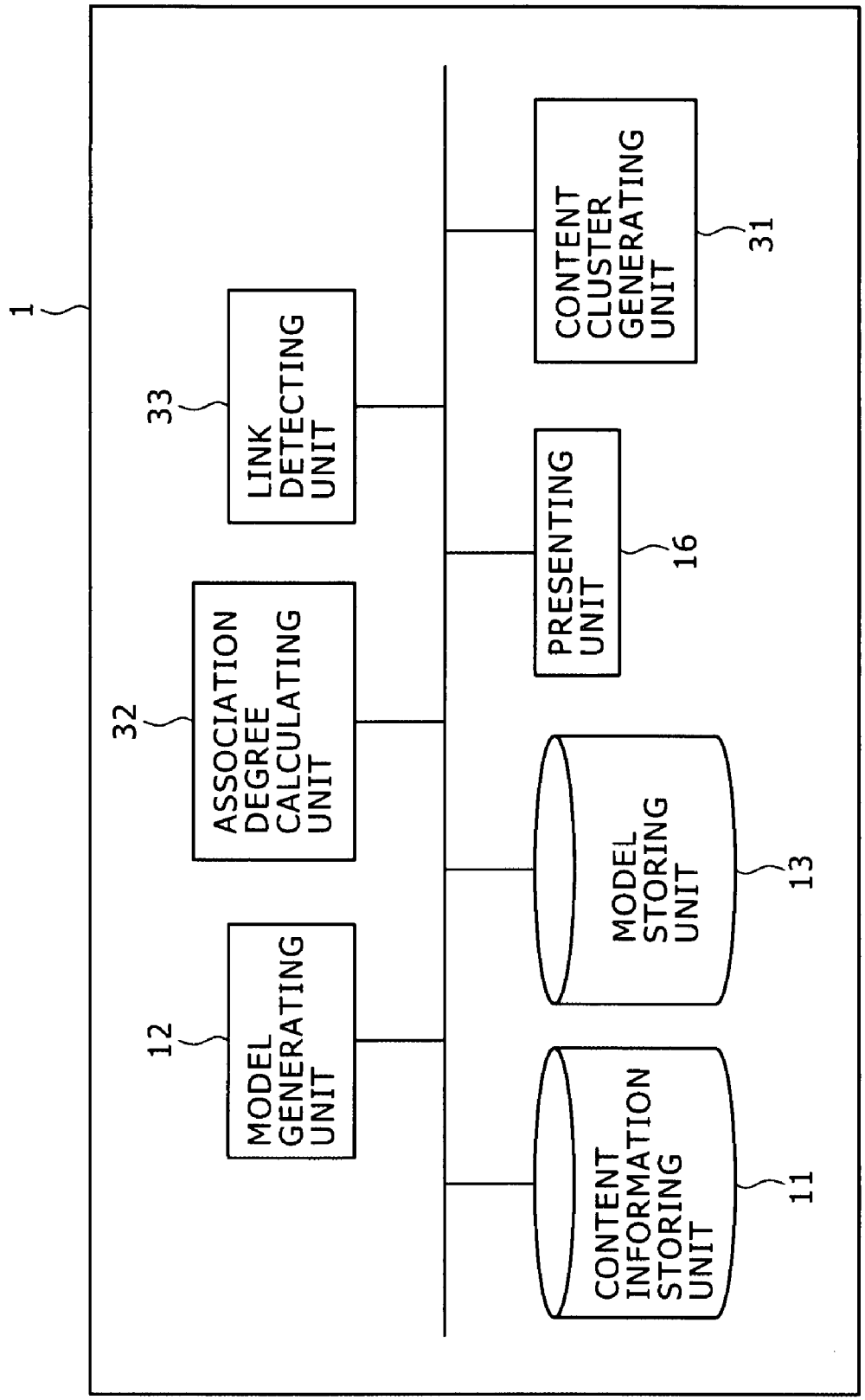
FIG. 17 is a block diagram showing an example of configuration of another information processing device to which an embodiment of the present invention is applied.

FIG. 17 shows an example of configuration of another information processing device 1 to which the present invention is applied. This information processing device 1 is formed by providing a content cluster generating unit 31, an association degree calculating unit 32 in place of the association degree calculating unit 14, and a link detecting unit 33 in place of the link detecting unit 15 in the information processing device 1 of FIG. 1.

The content cluster generating unit 31 clusters link destination candidate contents by an appropriate method.

The association degree calculating unit 32 calculates degrees of association of sets of clusters (hereinafter referred to as link destination candidate clusters) of the link destination candidate contents which clusters are generated by the content cluster generating unit 31 and extracted information with a link source content.

The link detecting unit 33 detects link destination contents and relativity information from the degrees of association of the sets of the link destination candidate clusters and the extracted information with the link source content, the degrees of association being calculated by the association degree calculating unit 32.

Figure 18:
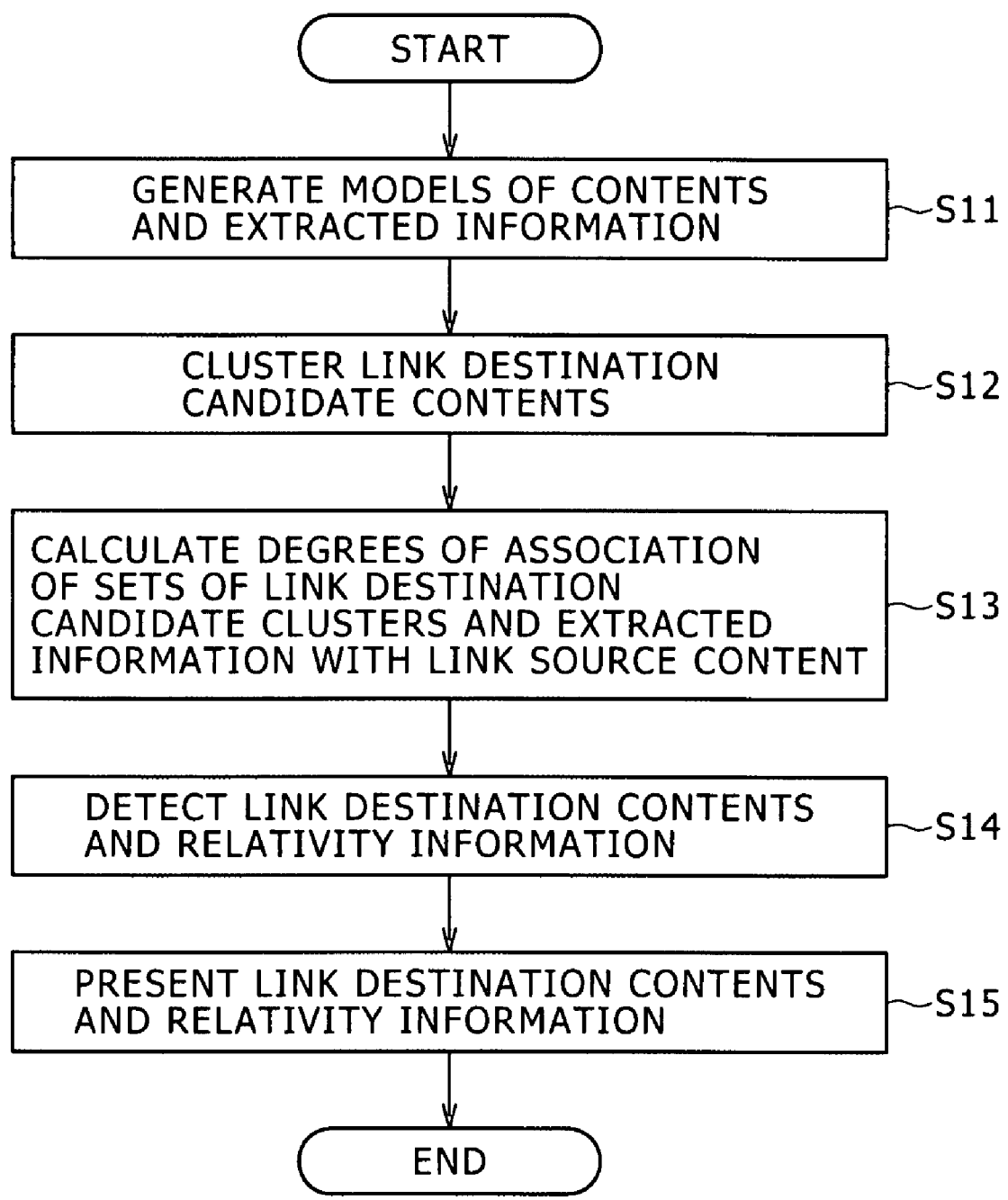
FIG. 18 is a flowchart of assistance in explaining a presenting process of the information processing device of FIG. 17.

The operation of the information processing device 1 will be described with reference to a flowchart of FIG. 18.

In step S11, as in step S1 in FIG. 2, a model generating unit 12 generates a model of contents (FIG. 7) and a model of extracted information (FIG. 8), and stores the model of the contents and the model of the extracted information in a model storing unit 13.

In step S12, the content cluster generating unit 31 clusters the link destination candidate contents.

This clustering method is arbitrary; region splitting type clustering such as the k-means method, hierarchical clustering such as a furthest neighbor method, and the like can be used. Alternatively, a group of contents within a partial region in a space divided by a Voronoi diagram generated for the modeled extracted information may be treated as a content cluster.

When the contents are "artist A", "artist B", "artist C", "artist D", and "artist E" as in the above-described example, and the link source content is "artist A", a first link destination candidate cluster 1 of "artist B" and "artist C" as link destination candidate contents and a second link destination candidate cluster 2 of "artist D" and "artist E", for example, are generated.

In step S13, the association degree calculating unit 32 calculates degrees of association of sets of the link destination candidate clusters and the extracted information with the link source content.

When the contents and the extracted information are modeled by LSA, a degree of association of a set of jth extracted information Hj and a kth link destination candidate cluster CCk with an ith link source content Ci is calculated by Equation (10).

[Equation 10]

$$f_i(h_j, cc_k) = \frac{w_j \cdot \sum_{d \in Dk} d \cdot w_j \cdot d_i}{|w_j| \sum_{d \in Dk} d ||w_j|| d_i|} \quad (10)$$

When the model of the contents and the model of the extracted information are the models shown in FIG. 7 and FIG. 8, and the first link destination candidate cluster 1 of "artist B" and "artist C" as link destination candidate contents and the second link destination candidate cluster 2 of "artist D" and "artist E" are generated, the degrees of association of the sets of the link destination candidate clusters and the extracted information with the link source content as shown in FIG. 19 are calculated.

In step S14, the link detecting unit 33 detects link destination contents and relativity information on the basis of the degrees of association of the sets of the link destination candidate clusters and the extracted information with the link source content, the degrees of association being calculated by the association degree calculating unit 32.

When the degrees of association shown in FIG. 19 are obtained, supposing that a threshold value for the degrees of association is 0.5, the sets having a degree of association equal to or higher than the threshold value are as follows.

(sad, the link destination candidate cluster 1),
(heartrending, the link destination candidate cluster 1),
(sentimental, the link destination candidate cluster 1),
(groovy, the link destination candidate cluster 2), and
(vibrant, the link destination candidate cluster 2)

Therefore "artist B" and "artist C" classified into the link destination candidate cluster 1 and "artist D" and "artist E" classified into the link destination candidate cluster 2 are detected as link destination contents, while "sad", "heartrending", and "sentimental" are detected as relativity information corresponding to "artist B" and "artist C", and "groovy" and "vibrant" are detected as relativity information corresponding to "artist D" and "artist E".

In next step S15, the presenting unit 16 presents the link destination contents and the relativity information detected in step S14 to the user.

FIG. 20 shows an example of display of the link destination contents and the relativity information detected on the basis of the degrees of association shown in FIG. 19 when the threshold value is set at 0.5.

In this example, as in the example of FIG. 10, as contents associated with a musical piece of "artist A" (link source content), the names and the like of "artist B" and "artist C" are displayed so as to correspond to each of "sad", "heartrending", and "sentimental", and the names and the like of "artist D" and "artist E" are displayed so as to correspond to each of "groovy" and "vibrant". Backgrounds that differ for different clusters are added to the display of the artists (the same background is added to the display of "artist B" and "artist C", and the same background is added to the display of "artist D" and "artist E").

Incidentally, also in this example, the extracted information cluster generating unit 21 can be provided as in the case of the information processing device 1 of FIG. 12, so that degrees of association of sets of the link destination candidate clusters and extracted information clusters with the link source content are calculated as shown in FIG. 21, and the link destination contents and the relativity information are detected on the basis of the degrees of association. In addition, it is possible to calculate degrees of association of the extracted information clusters with the link source content as shown in FIG. 16, and detect the link destination contents and the extracted information using the degrees of association.

Figure 22:
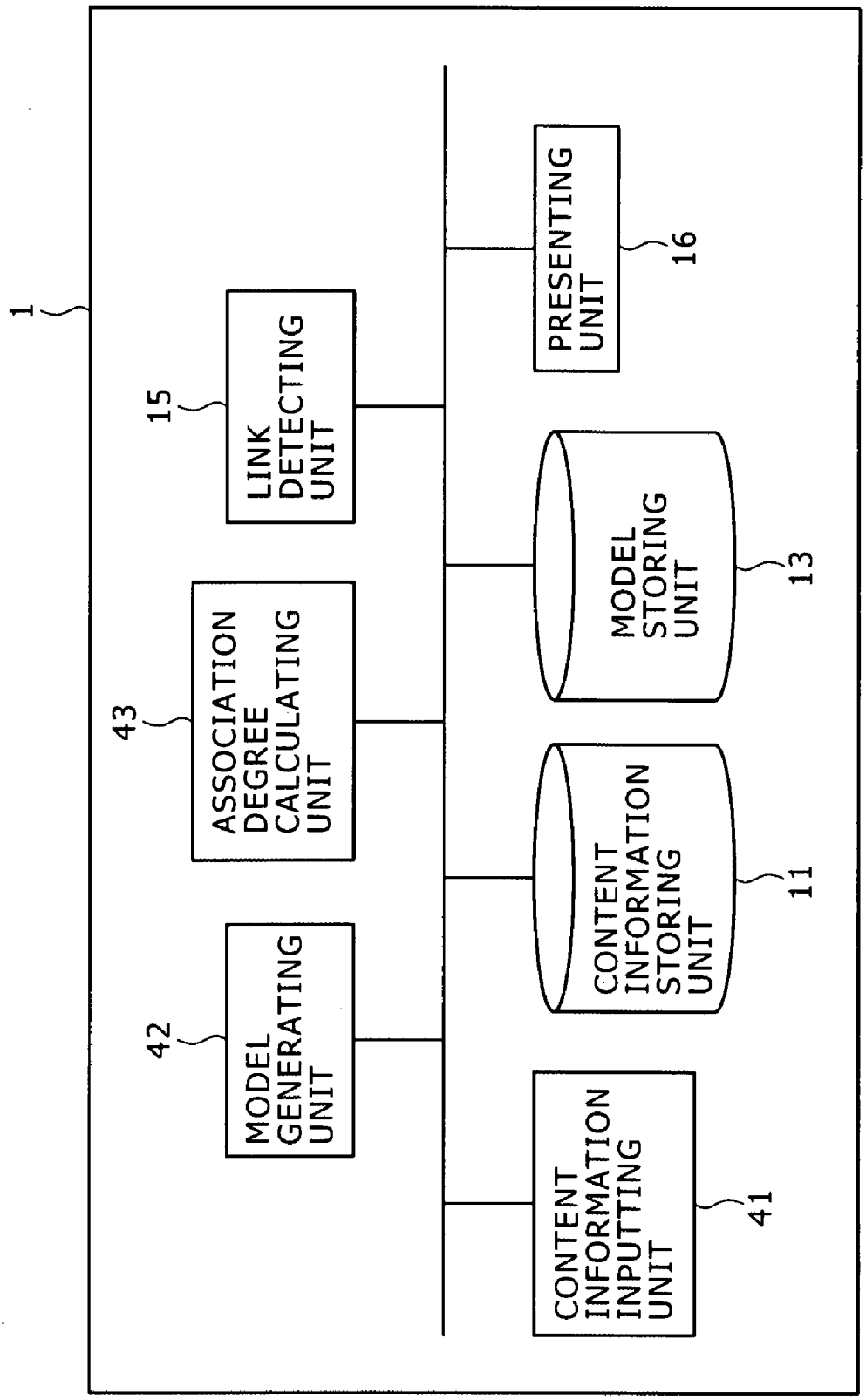
FIG. 22 is a block diagram showing an example of configuration of another information processing device 1 to which an embodiment of the present invention is applied.

FIG. 22 shows an example of configuration of another information processing device 1 to which the present invention is applied. This information processing device 1 is formed by further providing a content information inputting unit 41, providing a model generating unit 42 in place of the model generating unit 12, and providing an association degree calculating unit 43 in place of the association degree calculating unit 14 in the information processing device 1 of FIG. 1.

It takes time and cost to regenerate a model of contents and a model of extracted information as described above (step S1 in FIG. 2) each time a new content is added, with content information including the content information of the new content.

Accordingly, the information processing device 1 simply reconstructs the model of the contents by adding a vector of the content information of a new content to the already generated model of the contents when the new content is added.

The content information inputting unit 41 receives the content information of the new content, and then supplies the content information of the new content to the model generating unit 42.

Before the content information is supplied from the content information inputting unit 41 to the model generating unit 42, as with the model generating unit 12 in FIG. 12, the model generating unit 42 has generated a model of contents and a model of extracted information from content information stored in a content information storing unit 11, and has stored the model of the contents and the model of the extracted information in a model storing unit 13.

When the content information is supplied from the content information inputting unit 41, the model generating unit 42 adds a vector of the content information to the model of the contents which model is stored in the model storing unit 13, and thereby reconstructs the model of the contents.

Specifically, when the contents and the extracted information are modeled by LSA, for example, the vector Dnew of the new content (the content information of the new content) is converted into a vector D'new corresponding to the already generated model of the contents by the already generated model (matrix W) of the extracted information, as shown in Equation (11).

[Equation 11]

$$d'_{new} = W d_{new} \quad (11)$$

Then the thus calculated vector D'new is added to the already generated model (matrix D) of the contents, and thus the model of the contents is reconstructed.

For example, when the model of the contents shown in FIG. 7 and the model of the extracted information shown in FIG. 8 have already been generated from the content-extracted information frequency matrix X shown in FIG. 3, a personal diary is added as a new content, and sentences "A sad event happened today. I cannot endure the heartrending sorrow" are supplied as content information from the content information inputting unit 41, the model generating unit 42 determines the vector Dnew of this content information corresponding to "sad", "heartrending", "sentimental", "groovy", "vibrant", and "pure" as the extracted information as shown in Equation (12) (the vector Dnew is a group of frequencies of extraction of these pieces of extracted information from the content information of the new content).

[Equation 12]

$$d_{new}=(1.1.0.0.0.0) \quad (12)$$

Then, the model generating unit 42 calculates Equation (11) using the vector Dnew shown in Equation (12), obtains the vector D'new corresponding to the already generated model of the contents (FIG. 7) (three-dimensional matrix D) as shown in Equation (13), and then adds the vector D'new to the model of the contents (FIG. 7), whereby the model of the contents is reconstructed.

[Equation 13]

$$d'new=(3.92, 0.04, 0.53) \quad (13)$$

Thus the model of the contents is reconstructed.

Returning to FIG. 22, the association degree calculating unit 43 calculates degrees of association of sets of link destination candidate contents and the extracted information with a link source content, using the model of the contents reconstructed by the model generating unit 42 and the already generated model of the extracted information (by calculating Equation (4), for example).

For example, when the model of the contents reconstructed by adding the vector D'new shown in Equation (13) to the model of the contents shown in FIG. 7 is used, supposing that the new content is the link source content, the degrees of association of the sets of the link destination candidate contents shown in FIG. 23 (the artist A is a link destination candidate content in this case) and the extracted information are obtained.

Returning to FIG. 22, the link detecting unit 15 for example detects the link destination candidate contents of sets having a high degree of association among the degrees of association calculated by the association degree calculating unit 43 as link destination contents, and detects the extracted information of the sets as relativity information.

Specifically, when the degrees of association shown in FIG. 23 are obtained, supposing that a threshold value for the degrees of association is 0.5, the sets having a degree of association equal to or higher than the threshold value are as follows.

(sad, the artist A), (sad, the artist B), (sad, the artist C), (heartrending, the artist A), (heartrending, the artist B), (heartrending, the artist C)

(sentimental, the artist A), (sentimental, the artist B), and (sentimental, the artist C)

Therefore "artist A", "artist B", and "artist C" are detected as link destination contents, while "sad", "heartrending", and "sentimental" are detected as relativity information corresponding to "artist A", "artist B", and "artist C".

As in FIG. 1, the presenting unit 16 for example generates a display screen for displaying the names or the like of the link destination contents and the relativity information detected by the link detecting unit 15, and then displays the display screen on a display unit not shown in the figure, thereby presenting the link destination contents and the relativity information to the user.

As described above, the model of the contents can be reconstructed simply when a new content is added. Therefore, even when a new content is added, the link destination contents and the relativity information can be detected easily.

In addition, because the link destination contents and the relativity information are thus detected easily, when a new content is added, it is possible to set the new content as the link source content, detect the link destination contents and the relativity information on the basis of relations thereof to the new content, and present the link destination contents and the relativity information. That is, each time the diary is updated, for example, link destination contents and relativity information corresponding to the contents of the update can be presented to the user.

Incidentally, also in this example, the extracted information cluster generating unit 21 can be provided as in the case of the information processing device 1 of FIG. 12, so that degrees of association of sets of the link destination candidate contents and extracted information clusters with the link source content (for example the added diary) are calculated as shown in FIG. 24, and the link destination contents and the relativity information are detected on the basis of the degrees of association.

While each part is provided within one information processing device 1 in FIG. 1, FIG. 12, FIG. 17, and FIG. 22, each part does not necessarily need to be provided within one information processing device 1, and for example modules for implementing each part may be distributed on a network.

The series of processes described above can be carried out not only by hardware but also by software. When the series of processes is to be carried out by software, a program constituting the software is installed onto a general-purpose personal computer or the like.

FIG. 25 shows an example of configuration of an embodiment of a computer on which the program for carrying out the above-described series of processes is installed.

The program can be recorded in advance on a hard disk 2005 as a recording medium included in the computer or in a ROM 2003.

Alternatively, the program can be stored (recorded) temporarily or permanently on a removable recording medium 2011 such as a flexible disk, a CD-ROM (Compact Disk-Read Only Memory), an MO (Magneto-Optical) disk, a DVD (Digital Versatile Disk), a magnetic disk, a semiconductor memory or the like. Such a removable recording medium 2011 can be provided as so-called packaged software.

Incidentally, in addition to being installed from the above-described removable recording medium 2011 onto the computer, the program can be transferred from a download site to the computer by radio via an artificial satellite for digital satellite broadcasting, or transferred to the computer by wire via a network such as a LAN (Local Area Network), the Internet and the like, and the computer can receive the thus transferred program by a communication unit 2008 and install the program onto the built-in hard disk 2005.

The computer includes a CPU (Central Processing Unit) 2002. The CPU 2002 is connected with an input-output interface 2010 via a bus 2001. When a user inputs a command via the input-output interface 2010 by for example operating an input unit 2007 formed by a keyboard, a mouse, a microphone and the like, the CPU 2002 executes a program stored in the ROM (Read Only Memory) 2003 according to the command. Alternatively, the CPU 2002 loads the program stored on the hard disk 2005, the program transferred from the satellite or the network, received by the communication unit 2008, and then installed onto the hard disk 2005, or the program read from the removable recording medium 2011 loaded in the drive 2009 and then installed onto the hard disk 2005 into a RAM (Random Access Memory) 2004, and then executes the program. The CPU 2002 thereby performs the processing performed by the configurations of the block diagrams described above. Then, as required, the CPU 2002 for example outputs a result of the processing to an output unit 2006 formed by an LCD (Liquid Crystal Display), a speaker and the like via the input-output interface 2010, transmits the result from the communication unit 2008 via the input-output interface 2010, or records the result onto the hard disk 2005.

The program may be processed by one computer, or may be subjected to distributed processing by a plurality of computers. Further, the program may be transferred to a remote computer and then executed.

It is to be noted that embodiments of the present invention are not limited to the foregoing embodiments, and are susceptible of various changes without departing from the spirit of the present invention.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing device comprising:
    generating means for generating, by a processor and on a basis of a plurality of contents, extracted information extracted from content information of said plurality of contents, and values indicated by said extracted information for each of said contents, a numerical model of said contents and a numerical model of said extracted information in a same space of two dimensions or more;
    calculating means for calculating, by the processor, degrees of association of sets of link destination candidate contents other than a predetermined link source content among said plurality of contents and said extracted information with said link source content, using the numerical model of said contents and the numerical model of said extracted information in said same space, the degrees of association indicating degrees to which the predetermined link source content and the extracted information are associated with each other as viewed from the link destination candidate contents;
    link detecting means for detecting, by the processor, a link destination content associated with said link source content and relativity information indicating relativity between said link destination content and said link source content on a basis of said degrees of association calculated by said calculating means;
    cluster generating means for generating clusters of said extracted information by grouping said extracted information, wherein:
        said calculating means converts the calculated degrees of association of the sets of said link destination candidate contents and said extracted information with said link source content into degrees of association corresponding to the clusters of said extracted information, and
        said link detecting means sets said link destination candidate content of said set having the degree of association higher than a threshold value, the degree of association corresponding to a cluster of said extracted information, as said link destination content, and sets representative extracted information representative of the cluster of said extracted information of said set as said relativity information; and
    presenting means for presenting said link destination content and said relativity information detected by said link detecting means.

2. The information processing device as claimed in claim 1, wherein said link detecting means sets said link destination candidate content of said set having said degree of association higher than a threshold value as said link destination content, and sets the extracted information of said set as said relativity information.

3. The information processing device as claimed in claim 1, wherein said presenting means displays said link destination content and said relativity information detected by said link detecting means.

4. The information processing device as claimed in claim 3, wherein said presenting means displays all or a part of content information of said link destination content in correspondence with display of said link destination content.

5. The information processing device as claimed in claim 4, wherein said presenting means highlights a part corresponding to said relativity information in said content information displayed in correspondence with the display of said link destination content.

6. The information processing device as claimed in claim 3, wherein said presenting means determines a form of display of one of the link destination content and the relativity information on the basis of said degrees of association.

7. The information processing device as claimed in claim 1, further comprising cluster generating means for generating link destination candidate clusters of said link destination candidate contents by grouping said link destination candidate contents,
    wherein said calculating means calculates degrees of association of sets of said link destination candidate clusters and said extracted information with said link source content, and
    said link detecting means sets a link destination candidate content belonging to said link destination candidate cluster of said set having said degree of association higher than a threshold value as said link destination content, and sets said extracted information of said set as said relativity information.

8. The information processing device as claimed in claim 1, further comprising inputting means for inputting content information, wherein said generating means reconstructs the model of said contents by generating a vector corresponding to said extracted information of said content information input by said inputting means and adding the vector to the already generated numerical model of said contents.

9. An information processing method comprising the steps of:
    generating, by a processor and on a basis of a plurality of contents, extracted information extracted from content information of said plurality of contents, and values indicated by said extracted information for each of said contents, a numerical model of said contents and a numerical model of said extracted information in a same space of two dimensions or more;
    calculating, by the processor, degrees of association of sets of link destination candidate contents other than a predetermined link source content among said plurality of contents and said extracted information with said link source content, using the numerical model of said contents and the numerical model of said extracted information in said same space, the degrees of association indicating degrees to which the predetermined link source content and the extracted information are associated with each other as viewed from the link destination candidate contents;

detecting, by the processor, a link destination content associated with said link source content and relativity information indicating relativity between said link destination content and said link source content on a basis of said degrees of association calculated in a process of said calculating step;

generating, by the processor, clusters of said extracted information by grouping said extracted information;

converting, by the processor, the calculated degrees of association of the sets of said link destination candidate contents and said extracted information with said link source content into degrees of association corresponding to the clusters of said extracted information;

setting, by the processor, said link destination candidate content of said set having the degree of association higher than a threshold value, the degree of association corresponding to a cluster of said extracted information, as said link destination content, and sets representative extracted information representative of the cluster of said extracted information of said set as said relativity information; and presenting said link destination content and said relativity information detected in a process of said link detecting step.

10. A recording storage medium storing a program for making a computer perform a presenting process for presenting information indicating a content associated with a particular content, said presenting process comprising the steps of:

generating, on a basis of a plurality of contents, extracted information extracted from content information of said plurality of contents, and values indicated by said extracted information for each of said contents, a numerical model of said contents and a numerical model of said extracted information in a same space of two dimensions or more;

calculating degrees of association of sets of link destination candidate contents other than a predetermined link source content among said plurality of contents and said extracted information with said link source content, using the numerical model of said contents and the numerical model of said extracted information in said same space, the degrees of association indicating degrees to which the predetermined link source content and the extracted information are associated with each other as viewed from the link destination candidate contents;

detecting a link destination content associated with said link source content and relativity information indicating relativity between said link destination content and said link source content on a basis of said degrees of association calculated in a process of said calculating step;

generating clusters of said extracted information by grouping said extracted information;

converting the calculated degrees of association of the sets of said link destination candidate contents and said extracted information with said link source content into degrees of association corresponding to the clusters of said extracted information;

setting said link destination candidate content of said set having the degree of association higher than a threshold value, the degree of association corresponding to a cluster of said extracted information, as said link destination content, and sets representative extracted information representative of the cluster of said extracted information of said set as said relativity information; and presenting said link destination content and said relativity information detected in a process of said link detecting step.

11. An information processing device comprising:

a generating section for generating, by a processor and on a basis of a plurality of contents, extracted information extracted from content information of said plurality of contents, and values indicated by said extracted information for each of said contents, a numerical model of said contents and a numerical model of said extracted information in a same space of two dimensions or more;

a calculating section for calculating, by the processor, degrees of association of sets of link destination candidate contents other than a predetermined link source content among said plurality of contents and said extracted information with said link source content, using the numerical model of said contents and the numerical model of said extracted information in said same space, the degrees of association indicating degrees to which the predetermined link source content and the extracted information are associated with each other as viewed from the link destination candidate contents;

a link detecting section for detecting, by the processor, a link destination content associated with said link source content and relativity information indicating relativity between said link destination content and said link source content on a basis of said degrees of association calculated by said calculating section;

a cluster generating section for generating clusters of said extracted information by grouping said extracted information, wherein:

said calculating section converts the calculated degrees of association of the sets of said link destination candidate contents and said extracted information with said link source content into degrees of association corresponding to the clusters of said extracted information, and said link detecting section sets said link destination candidate content of said set having the degree of association higher than a threshold value, the degree of association corresponding to a cluster of said extracted information, as said link destination content, and sets representative extracted information representative of the cluster of said extracted information of said set as said relativity information; and a presenting section for presenting said link destination content and said relativity information detected by said link detecting section.

* * * * *